United States Patent
Urry et al.

[11] 3,852,307
[45] Dec. 3, 1974

[54] SYNTHESIS OF ZEARALANONE AND RELATED COMPOUNDS

[75] Inventors: Wilbert Herbert Urry, Chicago, Ill.; Guy Towns Mullenbach, Berkeley, Calif.

[73] Assignee: Commercial Solvents Corporation, Terre Haute, Ind.

[22] Filed: Apr. 25, 1972

[21] Appl. No.: 247,343

[52] U.S. Cl. ........ 260/343.2 F, 424/279, 260/340.9, 260/535 R, 260/586 R
[51] Int. Cl. .......................... C07d 9/00, C07d 7/20
[58] Field of Search ............... 260/343.2 R, 343.2 F

[56] References Cited
OTHER PUBLICATIONS
Taub et al., Chemical Communications, pp. 225–226, (1967), QD 1.C6c.

Primary Examiner—John M. Ford
Attorney, Agent, or Firm—Morton, Bernard, Brown, Roberts & Sutherland

[57] ABSTRACT

This invention provides a new synthesis for zearalanone and for related compounds having more or fewer carbon atoms in the non-aromatic ring than does zearalanone, which related compounds and zearalanone are represented by the formula

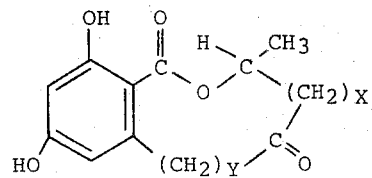

wherein X is an integer having a value from 0 to 6 inclusive and Y is an integer having a value from 3 to 8 inclusive. It also provides for new methods of making compounds useful in the synthesis of zearalanone and related compounds.

The compounds 6-acetoxyhexanoic acid; 2-(5-hexenoyl)-cyclohexanone; 7-keto-11-dodecenoic acid; 2-hydroxyethyl 7-keto-11-dodecenoate ethylene ketal; N,N-dimethyl 7-keto-11-dodecenamide ethylene ketal; 7-keto-11-dodecenal ethylene ketal; 9-keto-2,13-tetradecadienic acid ethylene ketal; 2-hydroxyethyl 9-keto-2,13-tetradecadienoate ethylene ketal; the sodium salt of ethyl 6-(6-keto-10-undecenyl)-β-dihydroresorcylate ethylene ketal; ethyl 3-bromo-6-(6-keto-10-undecenyl)-β-dihydroresorcylate ethylene ketal; ethyl 6-(6-keto-10-undecenyl)-β-resorcylate ehtylene ketal; ethyl 6-(6-keto-10-undecenyl)-β-resorcylate ethylene ketal dibenzyl ether; ethyl 6-(6-keto-10-hydroxyundecyl)-β-resorcylate ethylene ketal dibenzyl ether; and 6-(10-hydroxy-6-keto-undecyl)-β-resorcylic acid dibenzyl ether are disclosed. Methods for preparing these compounds are also disclosed.

3 Claims, No Drawings

SYNTHESIS OF ZEARALANONE AND RELATED COMPOUNDS

BRIEF SUMMARY OF THE INVENTION

The present invention is directed to a new process for the manufacture of zearalanone and related compounds, which related compounds and zearalanone are represented by the formula

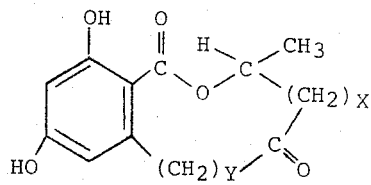

wherein X is an integer having a value from 0 to 6 inclusive and Y is an integer having a value from 3 to 8 inclusive. More specifically the invention relates to a process for making all of the foregoing compounds by a new series of process steps utilizing new intermediate compounds.

It is an object of the present invention to provide a new means for synthesizing zearalanone and related compounds.

It is another object of the invention to provide new intermediates useful in the preparation of zearalanone and related compounds.

It is a further object of the invention to provide new processes for producing intermediate compounds useful in the synthesis of zearalanone and related compounds.

These and other objects and advantages of the present invention will be apparent from the description of the invention.

DETAILED DESCRIPTION

Zearalanone, whose synthesis is one of the objects of this invention, has the structure illustrated by the formula:

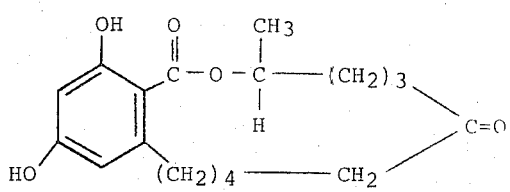

An examination of the above formula reveals that it has one asymmetric carbon atom and the compound produced by synthesis exists, therefore, as two enantiomorphs designated as D and L by the older Fischer convention and by R and S by the newer convention of Cahn and Ingold (Cahn, R. S. and Ingold, C. K., J. Chem. Soc. 612, (1951); Cahn, R. S., J. Chem. Educ. 41, 116 (1964).

Zearalanone produced by the reduction of natural zearalenone has the same S configuration as does the parent compound. The chemical name for zearalanone is: 6-(10-hydroxy-6-keto-undecyl)-β-resorcylic acid lactone. Zearalanone was one of the compounds described and claimed in U.S. Pat. No. 3,239,341 issued Mar. 8, 1966 to Hodge, et al. The compound was prepared by the reduction of a natural zearalenone, sometimes referred to as F.E.S. resulting from the fermentation of suitable nutrient media using the organism *Gibberella zeae* (Gordon) on deposit at the Northern Utilization Research and Development Division of the United States Department of Agriculture at Peoria, Illinois under the number NRRL-2830. The reduction was carried out by hydrogen under the influence of a catalyst such as palladium or platinum on char in a menstruum of ethyl alcohol (Tetrahedron Letters No. 27, pages 3,109–3,114, 1966).

The present invention embraces the discovery that zearalanone can be made readily by the sequence of reactions illustrated in Chart I.

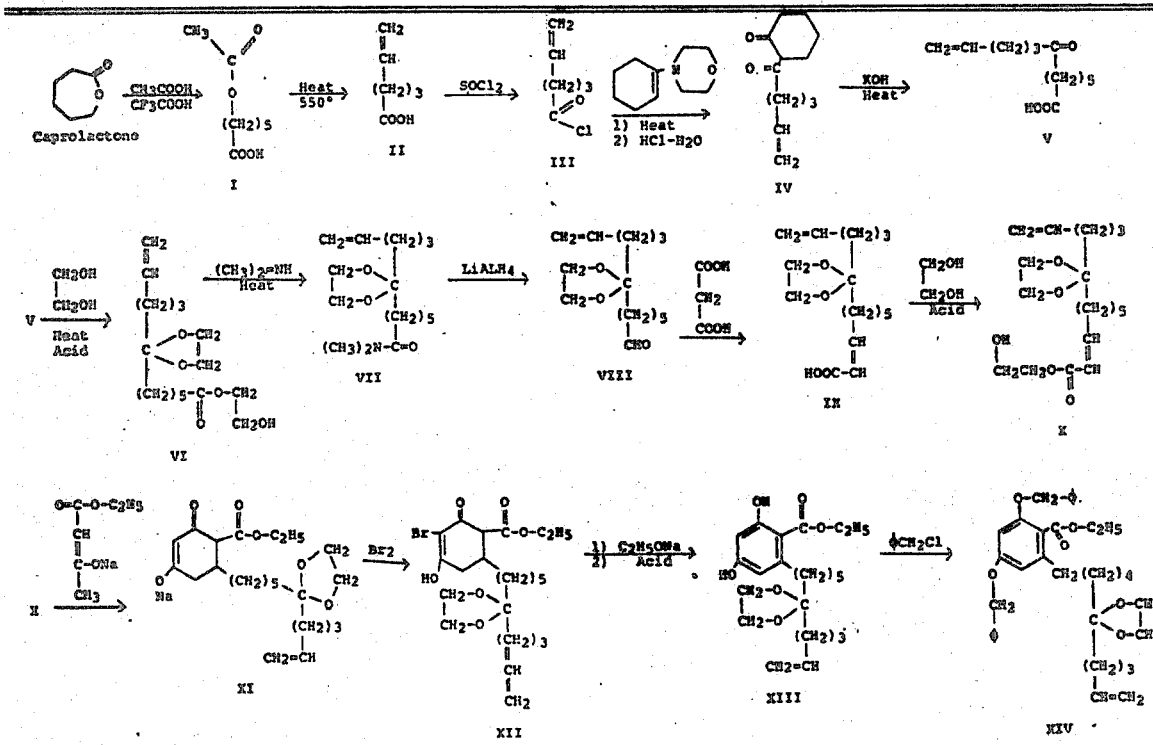

CHART I - ALPHA

Reactions for the Chemical Synthesis of (R,S)-Zearalanone

CHART I—ALPHA—Continued

Reactions for the Chemical Synthesis of (R,S)-Zearalanone

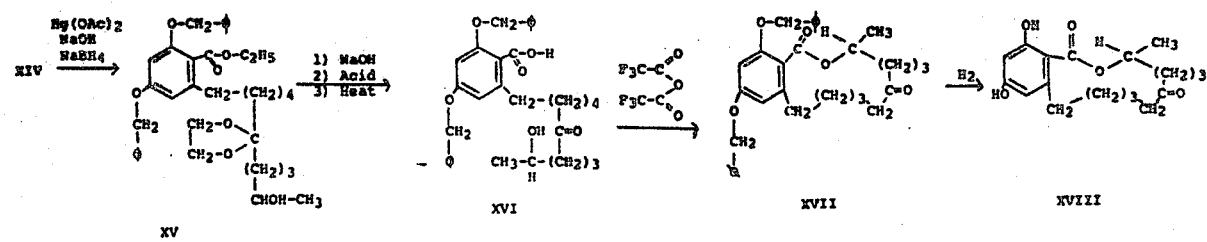

NOTES: φCH2Cl designates benzyl chloride; Hg(OAc)2 is mercuric acetate.

The first step in the sequence is the reaction of caprolactone with acetic acid under the influence of trifluoroacetic acid to produce 6-acetoxyhexanoic acid. The foregoing acid is pyrolyzed at 550° C to yield 5-hexenoic acid which is then reacted with thionyl chloride to form 5-hexenoyl chloride. This acid chloride is reacted with the morpholine enamine of cyclohexanone to prepare 2-(5-hexenoyl)-cyclohexanone which is then treated successively with potassium hydroxide and sulfuric acid to give 7-keto-11-dodecenoic acid. The foregoing acid is reacted with ethylene glycol to prepare 2-hydroxyethyl 7-keto-11-dodecenoate ethylene ketal which is reacted with dimethyl amine to yield N,N-dimethyl 7-keto-11-dodecenamide ethylene ketal. The above amide on treatment with lithium aluminum hydride gives 7-keto-11-dodecenal ethylene ketal which is reacted with malonic acid to prepare 9-keto-2,13-tetradecadienoic acid ethylene ketal which yields 2-hydroxyethyl 9-keto-2,13-tetradecadienoate ethylene ketal on esterification with ethylene glycol. The foregoing ester is then reacted with ethyl acetoacetate under the influence of sodium ethoxide to yield the sodium salt of ethyl 6-(6-keto-10-undecenyl)-β-dihydroresorcylate ethylene ketal. The dihydroresorcylate is brominated to prepare ethyl 3-bromo-6-(6-keto-10-undecenyl)-β-dihydroresorcylate ethylene ketal which is dehydrobrominated to yield ethyl 6-(6-keto-10-undecenyl)-β-resorcylate ethylene ketal. The foregoing resorcylate is reacted with benzyl chloride to produce ethyl 6-(6-keto-10-undecenyl)-β-resorcylate ethylene ketal dibenzyl ether which is treated successively with mercuric acetate, sodium hydroxide, and sodium borohydride to yield ethyl 6-(6-keto-10-hydroxyundecyl)-β-resorcylate ethylene ketal dibenzyl ether. The above dibenzyl ether is reacted successively with sodium hydroxide and hydrochloric acid to prepare 6-(10-hydroxy-6-ketoundecyl)-β-resorcylic acid dibenzyl ether which is subjected to the action of trifluoroacetic anhydride to yield (R,S)-zearalanone dibenzyl ether. The foregoing dibenzyl ether is hydrogenated using palladium on charcoal as a catalyst to give (R,S)-zearalanone.

The foregoing sequence of reactions, as well as the reactions described in the specific examples, can be carried out with appropriate starting materials to yield compounds related to (R,S)-zearalanone. They can be represented by the following formula:

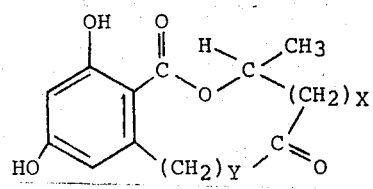

Where X and Y are integers which can take the values:

X = 0, 1, 2, 3, 4, 5, or 6
Y = 3, 4, 5, 6, 7, or 8.

The underlined values are those for zearalanone.

In the sequence of reactions shown in Chart I, the compound II may be represented more generally by the formula

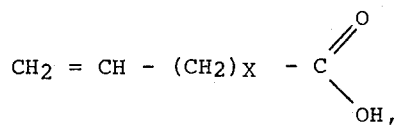

the compound III by the formula

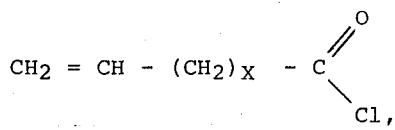

and the compound IV by the formula

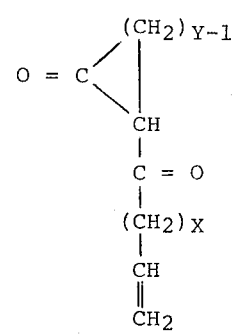

where X and Y have the same limiting values as given above.

For example, to obtain the compound related to (R,S)-zearalanone where X = 0, and Y = 3, the compounds III and IV would also be selected and prepared so that X = 1 and Y = 3. Accordingly, the specific starting materials in Chart I would be acrylyl chloride (CH₂ = CH—COCl) for compound III which would be reacted with the enamine of cyclobutanone to give the compound IV,

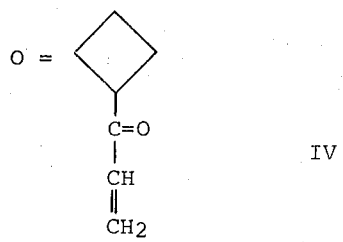   IV

The compounds produced by the process of this invention are useful in promoting the growth rate of meatproducing animals. The compounds can be administered to animals by any suitable method including subcutaneous injection of pellets under the skin of the ears of mammals as well as by oral and parenteral administrations. For example, the compounds can be formulated into pellets and put under the skin of the ear by a suitable gun or they can be suspended in a medium such as peanut oil and injected parenterally. The compounds can also be blended with ordinary feed containing nutritional values in an amount sufficient to produce the desired rate of growth and can thus be fed directly to animals.

When the compounds are to be fed directly to animals, the feed composition can be prepared containing the usual nutritionally balanced quantities of fats, carbohydrates, proteins, vitamins, and minerals together with the chosen compound. Some of these usual dietary elements are grains, such as ground grain and grain by-products: animal protein substances such as those found in fish meal and meat scraps; animal and vegetable fats; vegetable proteins like soybean oil meal or peanut oil meal; vitaminaceous materials, e.g. vitamin A and D mixture; riboflavin supplements and other vitamin B complex members; antibiotic supplements such as zinc bacitracin feed grade; and bone meal and limestone to provide minerals. A type of conventional feed material for use with cattle includes alfalfa hay and ground corn cobs together with supplementary antibiotics and vitaminaceous materials if desired.

The amount of compound administered to the animal, of course, depends upon the specific animal, its age and sex, and the desired rate of growth. Usually, administration of from about 1 to about 100 mg of a compound per animal per day produces significantly increased growth rate.

The following examples serve to illustrate the invention and set forth the best mode contemplated by the inventors for carrying out the invention.

In the following specific examples, the specific compounds used are such that in the general formula presented herein X = 3 and Y = 5. The specific reactions, however, are illustrative of the more general reactions where the compounds are generally represented with X being an integer of 0 to 6 inclusive and Y being an integer of 3 to 8 inclusive.

The abbreviations used in the following examples are described in these paragraphs. The description of a nuclear magnetic resonance (nmr) scan is identified by the letters nmr followed by the solvent and reference substance placed in parenthesis; thus, nmr (CDCl$_3$, TMS) means that the scan was made with deuterated chloroform as the solvent and tetramethylsilane as the reference substance. The position of the identified peaks may be described by the value:

$\delta$ = cycles per second from TMS divided by sixty (This relation applies with a 60 megaherz instrument)

$\delta$ = c.p.s. ÷ 60 or by $\tau$ = ten minus $\delta$ (10 − $\delta$)

The type of peak is shown by the first letter of the word describing the peak and is followed by a numeral indicating the number of hydrogen atoms involved. Examples are as follows:

| | |
|---|---|
| s,1 | = singlet, one hydrogen |
| s,2 | = singlet, two hydrogens |
| d,1 | = doublet, one hydrogen |
| t,2 | = triplet, two hydrogens |
| m,4 | = multiplet, four hydrogens |
| broad s,1 | = a broad singlet for one hydrogen which may result from OH, COOH, CHO. |

Coupling constants are valuable for identification of the positions of hydrogen atoms and with respect to variations of the electronic environments. The coupling constants are measured as the distance between the peaks in question on the x-axis of the scan and are recorded as J values in terms of c.p.s.

Cycles per second are denoted by c.p.s. and by Hz.

In all of the examples, the temperatures are in degrees centigrade. In the nmr data, TMS is tetramethylsilane; DSS is sodium 2,2-dimethyl-2-silapentane-5-sulfonate.

EXAMPLE 1

This example illustrates the preparation of 6-acetoxyhexanoic acid I by the following reaction:

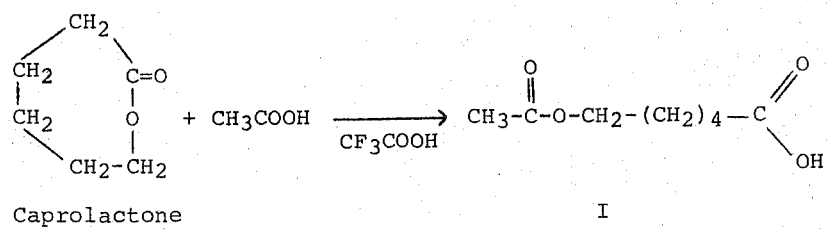

Caprolactone                                    I

A solution containing 300 g, 2.63 mol, of caprolactone and 12 ml of trifluoroacetic acid in 1,200 ml of glacial acetic acid was held at reflux under nitrogen for 11.5 hr. Then 300 ml of acetic acid was removed over 8 hr by slow distillation. The remaining acetic acid was evaporated in a vacuum rotary evaporator to yield 458 g, 2.63 mol (100 percent), of crude I: nmr (CDCl$_3$, TMS) $\delta$10.55 (s, 1, COOH), 4.02 (t, 2, J = 7Hz, COOCH$_2$), 2.33 (t, 2, J = 6.5 Hz, CH$_2$COO), 1.98 (s, 3, CH$_3$), and 1.60 ppm (br m, 6, CH$_2$(CH$_2$)$_3$CH$_2$).

In Example 1 it is feasible to use any one of a number of strong acids, for example sulfuric acid, to catalyze the reaction between the lactone and acetic acid. The advantage of CF$_3$COOH is that it distills overhead in the distillation step.

EXAMPLE 2

This example illustrates the preparation of 5-hexenoic acid II by the following reaction:

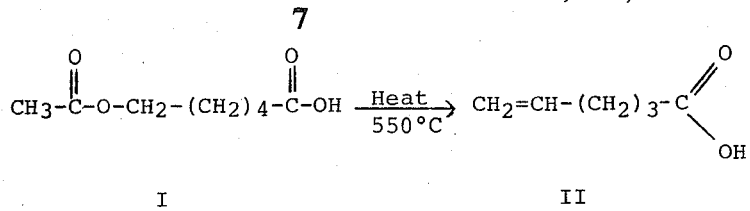

I            II

In a very slow moving stream of nitrogen, 473 g, 2.71 mol, of crude I was passed slowly down a 50 cm column packed with 3 mm Pyrex helices and maintained at ca. 550° by an electric oven. The brown product was fractionally distilled to yield 189.1 g, 1.65 mol (61 percent) of II; bp 86°–87° (4.8 mm): $n_d^{24}$ 1.4346 [bp 101°–105° (13 mm), $n_D^{25}$ 1.4318]; nmr (CDCl$_3$, TMS) $\delta$11.68 (s, 1, COOH), 5.72, 4.92 and 4.88 (3 m, 3, CH=CH$_2$), 2.32 (t, 2, J = 6.5 Hz, CH$_2$COO), 2.04 (m, 2, CH$_2$CH=CH$_2$) and 1.68 ppm (m, 2, CH$_2$CH$_2$CH$_2$).

EXAMPLE 3

This example illustrates the preparation of 5-hexenoyl chloride III by the following general reaction wherein X = 3:

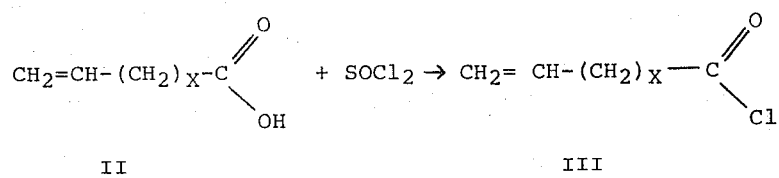

II            III 233 g, 1.96 mol, of thionyl chloride was added dropwise to 148.8 g, 1.30 mol of II stirred under nitrogen at 25°. The reaction mixture was held at reflux until evolution of hydrogen chloride had ceased. After an additional 45 min at reflux, 75 ml of benzene was added and the solution was fractionally distilled to yield 131.5 g, 0.992 mol (76 percent) of III: bp 43°–44° (13 mm) [bp 43°–44° (13 mm)]; nmr (CDCl$_3$, TMS) $\delta$5.72, 4.92 and 4.88 (3 m, 3, CH=CH$_2$), 2.87 (t, 2, J = 6.5 Hz, CH$_2$COCl), and 2.00 ppm (m, 4, (CH$_2$)$_2$CH$_2$CO).

EXAMPLE 4

This example illustrates the preparation of 2-(5-hexenoyl)-cyclohexanone IV by the following reactions:

The morpholine enamine of cyclohexanone was prepared by the method of Stork (J. Amer. Chem. Soc. 85, 207, 1963). 12.4 g, 0.0936 mol, of III was added dropwise with rapid stirring to a solution of 27.7 g, 0.166 mol, of the enamine in 150 ml of dry benzene under nitrogen. The reaction mixture was held at reflux for 39.5 hr. After it had cooled, precipitated enamine hydrochloride was removed by filtration and washed with ether. A mixture of the filtrate, washings and 60 ml of 10 percent hydrochloric acid was then held at reflux under nitrogen with efficient stirring for 14 hr. The organic layer was separated, washed with water (2 × 75 ml), dried (MgSO$_4$); and the solvent was removed under vacuum. Fractional distillation of the crude product yielded 12.5 g, 0.0644 mol (69 percent), of pure IV (air sensitive): bp 62°–63° (0.02 mm); nmr (CDCl$_3$, TMS) $\delta$11.58 (br s, ca. 0.3, tautomeric OH), 5.72, 4.92 and 4.88 (3 m, 3, CH=CH$_2$), 3.56 (m, ca. 0.7, COCHCO), 2.28 (br m, ca. 8, CH$_2$CO, CH$_2$CH=CH$_2$, and enolic CH$_2$—COH=), 1.64 ppm (br m, ca. 6, CH$_2$(CH$_2$)$_2$CH and CH$_2$CH$_2$CH$_2$). Anal. Calcd. for C$_{12}$H$_{18}$O$_2$: C, 74.2; H, 9.3. Found: C, 74.2; H, 9.4.

EXAMPLE 5

This example illustrates the preparation of 7-keto-11-dodecenoic acid, V, by the following reaction:

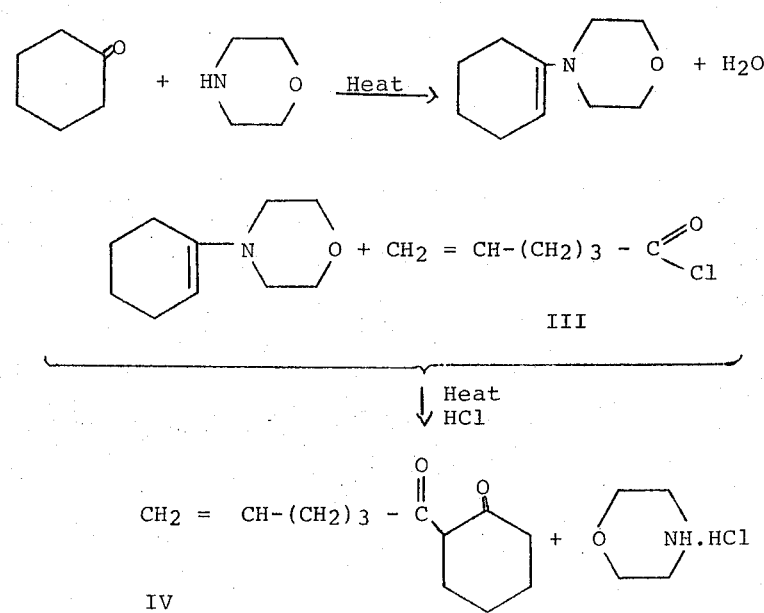

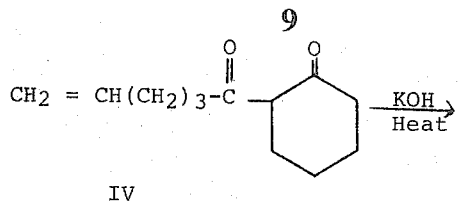

IV

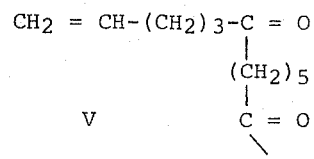

V

A more general illustration of this reaction is:

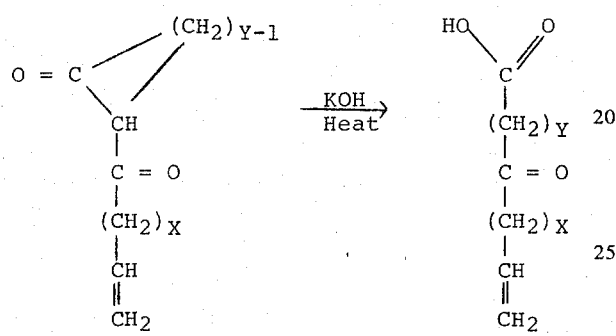

A solution containing 7.34 g, 0.0377 mol, of IV, 12.0 g of 85 percent aqueous potassium hydroxide, and 45 ml of methanol was held at reflux under nitrogen for 22 hr. The reaction mixture was diluted with 150 ml of water, washed with ether (2 × 100 ml), acidified with concentrated sulfuric acid, and extracted with benzene (3 × 200 ml). The extract was then washed with water until washings were neutral, and dried (MgSO$_4$). Benzene was removed under vacuum. The 6.90 g of crude product was recrystallized from hexane to give 5.43 g, 0.0256 mol (68 per cent), of pure V; mp 40°–42°; nmr (CDCl$_3$, TMS) δ11.50 (s, 1, COOH), 5.72, 4.92 and 4.88 (3 m, 3, CH=CH$_2$), 2.42 (t, 4, J = 6.5 Hz, CH$_2$COCH$_2$), 2.34 (t, 2, J = 6.5 Hz, CH$_2$COO), 2.00 (m, 2, CH$_2$CH=CH$_2$), and 1.58 ppm (br m, 8, CH$_2$CH$_2$CH$_2$ and CH$_2$(CH$_2$)$_3$CH$_2$). Anal. Calcd. for C$_{12}$H$_{20}$O$_3$: C, 67.8; H, 9.5. Found: C, 67.8; H, 9.4.

EXAMPLE 6

This example illustrates the preparation of 2-hydroxyethyl 7-keto-11-dodecenoate ethylene ketal VI by the following general reaction wherein X = 3 and Y = 5:

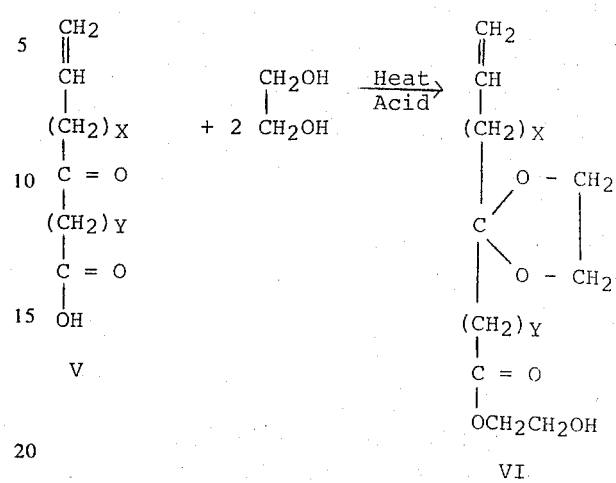

A solution of 59.15 g, 0.279 mol of V, 41.5 g, 0.669 mol, of ethylene glycol, and 0.05 g of p-toluenesulfonic acid monohydrate in 500 ml of benzene was held at reflux under nitrogen until water ceased to collect (16 hr) in the attached collecting trap (Dean-Stark trap). The reaction mixture was washed with 5 percent sodium bicarbonate (1 × 150 ml) and water (8 × 150 ml), and dried (Na$_2$SO$_4$, ketal function sensitive to MgSO$_4$). The solution was evaporated in a vacuum rotary evaporator. Molecular distillation of the residue gave 69.0 g, 0.227 mol (81 percent), of pure VI: nmr (CDCl$_3$, TMS), δ5.72, 4.92 and 4.88 (3 m, 3, CH=CH$_2$), 4.15 (m, 2, COOCH$_2$), 3.87 (s, 4, OCH$_2$CH$_2$O) 3.73 (m, 2, CH$_2$OH), 3.35 (s, 1, OH), 2.31 (t, 2, J =6.5 Hz, CH$_2$COO), 1.97 (m, 2, CH$_2$CH=CH$_2$), and 1.48 ppm (m, 12, CH$_2$(CH$_2$)$_2$—C—(CH$_2$)$_4$CH$_2$). Anal. Calcd. for C$_{16}$H$_{28}$O$_5$: C, 63.9; H, 9.3. Found: C, 63.7; H, 9.6.

In Example 6, the reaction of Compound V with ethylene glycol serves to protect the ketone group by forming a ketal, and also to form the 2-hydroxyethyl ester by reaction with the carboxyl group.

EXAMPLE 7

This example illustrates the preparation of N,N-dimethyl 7-keto-11-dodecenamide ethylene ketal VII by the following general reaction wherein X = 3 and Y = 5:

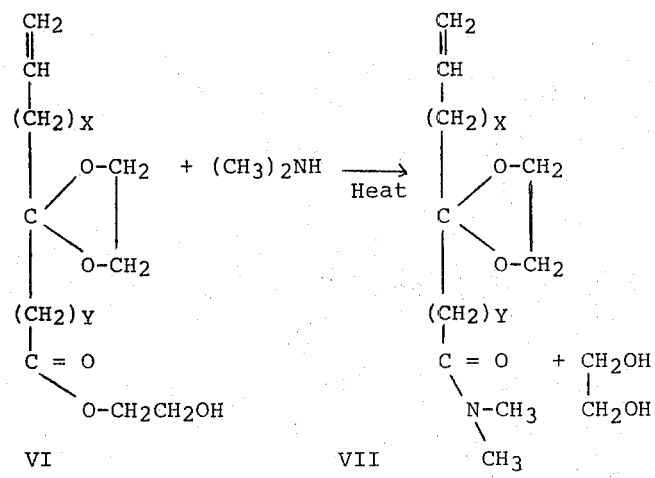

Dimethylamine was bubbled into a solution of 67.0 g, 0.223 mol, of VI in 100 ml of tetrahydrofuran cooled to −80° until 240 ml of solution had accumulated. It was held at 120° with stirring for 40 hr in an autoclave. Then, 200 ml of benzene was added to it. The resulting solution was washed with saturated brine (2 × 100 ml), dried ($Na_2SO_4$), and its solvent evaporated in a vacuum rotary evaporator. Fractional molecular distillation of residue afforded 53.5 g, 0.189 mol (85 percent) of pure VII: nmr ($CDCl_3$, TMS) δ5.72, 4.92 and 4.88 (3 m, 3, $CH=CH_2$), 3.86 (s, 4, $OCH_2CH_2O$), 2.96 and 2.88 (2 s, 6, $CH_3$), 2.26 (t, 2, J = 6.5 Hz, $CH_2CO$), 1.97 (m, 2, $CH_2CH=CH_2$ ), and 1.48 ppm (br m, 12, $CH_2(CH_2)_2$—C—$(CH_2)_4CH_2$). Anal. Calcd. for $C_{16}H_{29}O_3N$: C, 67.8; H, 10.3; N, 4.9. Found: C, 67.8; H, 10.2; N, 5.1.

EXAMPLE 8

This example illustrates the preparation of 7-keto-11-dodecenal ethylene ketal by the following general reaction wherein X = 3 and Y = 5:

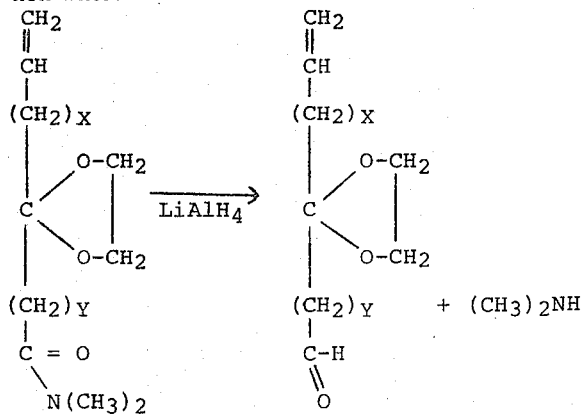

4.49 ml, 0.0458 mol, of ethyl acetate in 10 ml of ethyl ether was added dropwise to 46.8 ml of an ether solution of 0.98 M lithium aluminum hydride, 0.0458 mol, cooled in an ice bath, and stirred under nitrogen. The reaction mixture was cooled to −80°, and 20.0 g, 0.0707 mol, of VII in 25 ml of ethyl ether was added rapidly with stirring. It was warmed to 0°, and stirred for 3 hr. Then, 40 ml of 50 percent aqueous acetic acid was added to it, the organic layer was separated at once and it was washed immediately with dilute potassium carbonate solution (3 × 50 ml) and water (3 × 50 ml). It was dried ($Na_2SO_4$), and evaporated in a vacuum rotary evaporator (Rinco) to yield 16.58 g of crude VIII; nmr ($CDCl_3$, TMS) δ9.82 (t, 1, J = 1.5 Hz, CHO), 5.72, 4.92 and 4.88 (3 m, 3, $CH=CH_2$), 3.87 (s, 4, $OCH_2CH_2$O), 2.40 (t, 2, J = 6.5 Hz, $CH_2CO$), 2.06 (m, 2, $CH_2CH=CH_2$), and 1.48 ppm (br m, 12, $CH_2(CH_2)_2$—C-$(CH_2)_4CH_2$). Analysis of this nmr spectrum showed that this product contained about 20 percent 7-keto-11-dodecenal.

The bis-2,4-dinitrophenylhydrazone that was prepared from this mixture in acidic 95 percent ethanol, was recrystallized from absolute ethanol: mp 140°–141°. Anal. Calcd. for $C_{24}H_{28}N_8O_8$: C, 51.7; H, 5.1; N, 20.1. Found: C, 51.8; H, 5.1; N, 20.0.

EXAMPLES 9 and 10

These examples illustrate the preparation of 9-keto-2,13-tetradecadienoic acid ethylene ketal IX and 2-hydroxyethyl 9-keto-2,13-tetradecadienoate ethylene ketal X by the following general reactions wherein X = 3 and Y = 5:

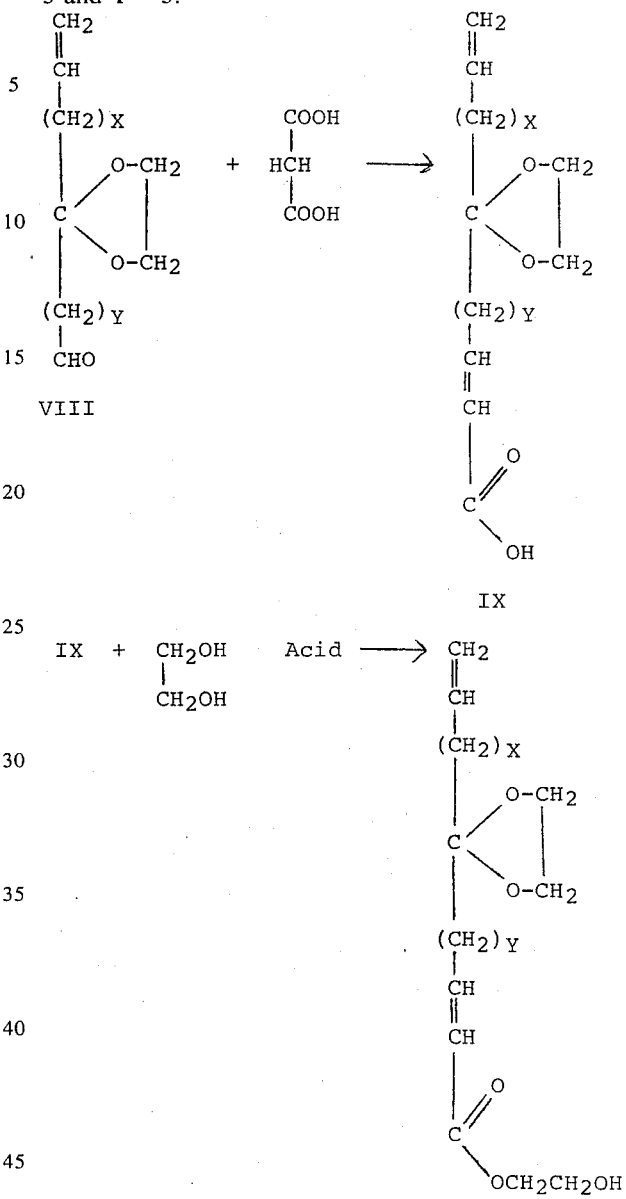

A reaction mixture containing 36.64 g, 0.152 mol, of VIII, 17.5 g, 0.168 mol, of malonic acid, and 75 ml of pyridine was stirred at 25° under nitrogen for 44 hr. An additional 17.5 g of malonic acid was added to it, and it was again stirred for 22 hr at 25°. The reaction mixture was then heated on a steam bath until carbon dioxide evolution ceased (23 hr). 90 ml of water was added to it, and the resulting mixture was extracted with ether (3 × 200 ml). The ether solution was washed rapidly with 1 percent hydrochloric acid (3 × 50 ml) and then it was extracted with 5 percent sodium hydroxide (2 × 50 ml) and water (3 × 50 ml). The alkaline aqueous solution obtained was washed with ether (2 × 50 ml). It was acidified with dilute hydrochloric acid, and the mixture was extracted immediately with ether (3 × 100 ml). The ether extract was washed with water until the washings were neutral, dried ($Na_2SO_4$), and evaporated in a vacuum rotary evaporator (Rinco) to yield 30.3 g, 0.107 mol (70 percent), of crude IX: nmr ($CDCl_3$, TMS) δ10.65 (s, 1, COOH), 7.19 and 6.92 (2 t, 1, $J_{AB}$ = 15.7 Hz, $J_{AX}$ = 7 Hz, $CH_2CH=CH$) 5.94 and 5.67 (2 t, 1, $J_{AB}$ =15.7 Hz, $J_{BX}$ = 1 Hz, CHCOO), 5.72, 4.92 and 4.88 3 m, 3, $CH=CH_2$), 3.92 (s, 4, $OCH_2CH_2O$), 2.12

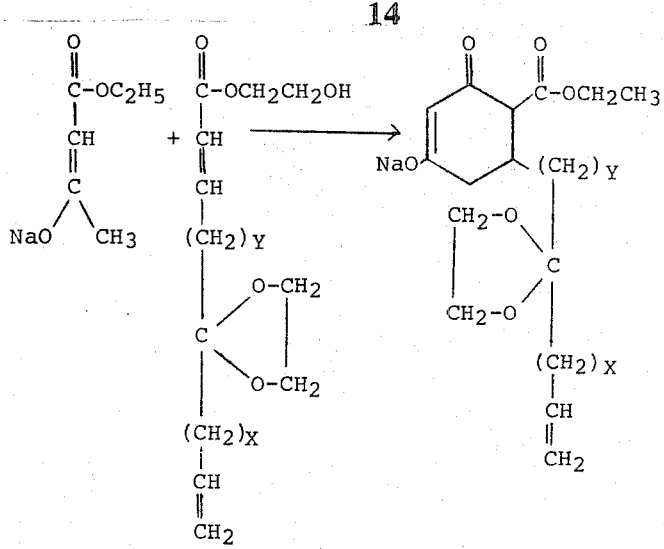

(br $m$, 4, $CH_2CH=CH_2$), and 1.50 ppm (br $m$, 12, $CH_2(CH_2)_2$—C—$(CH_2)_4CH_2$). Again, integration of the peak at $\delta 3.92$ and a multiplet at $\delta 2.4$ showed that some ketal hydrolysis had occurred.

Hence a solution of 32.0 g of the crude IX, 37.0 g of ethylene glycol, and 1.85 g of p-toluenesulfonic acid monohydrate in 250 ml of benzene was held at reflux for 40 hr while water was collected in a trap for determining the total amount of water given off in an evaporation (Dean-Stark trap). This reaction mixture was washed with dilute sodium bicarbonate solution (1 × 75 ml) and water (7 × 50 ml), dried ($Na_2SO_4$) and evaporated in a vacuum rotary evaporator to yield 40.0 g, 0.123 mol (ca. 100 percent) of X: nmr ($CDCl_3$, TMS) $\delta 7.07$ and 6.81 (2 $t$, 1, $J_{AB} = 15.7$ Hz, $J_{AX} = 7$ Hz, $CH_2CH=CH$), 5.91 and 5.65 (2 $t$, 1, $J_{AB} = 15.7$ Hz, $J_{BX} = 1$ Hz, CHCO), 5.72, 4.92 and 4.88 (3 $m$, 3, $CH=CH_2$), 4.20 ($m$, 2, $COOCH_2$), 3.86 ($s$, 4, $OCH_2CH_2O$), 3.67 ($m$, 2, $CH_2OH$), 3.17 ($s$, 1, OH), 2.06 (br $m$, 4, $CH_2CH=CH$), and 1.45 ppm (br $m$, 12, $CH_2(CH_2)_2$—C—$(CH_2)_4CH_2$).

In the foregoing example, the reaction of Compound IX with ethylene glycol results in the simultaneous protection of the ketone group by formation of a ketal and in formation of the 2-hydroxyethyl ester with the carboxyl group.

EXAMPLE 11

This example illustrates the preparation of the sodium salt of ethyl 6-(6-keto-10-undecenyl)-β-dihydroresorcylate ethylene ketal XI by the following general reaction wherein X = 3 and Y = 5:

6.12 g, 0.0470 mol, of freshly distilled ethyl acetoacetate was added dropwise to a solution of sodium ethoxide prepared from 1.08 g, 0.0470 mol, of sodium and 75 ml of ethanol that was stirred under nitrogen. Then this solution was held at reflux while 12.75 g, 0.0391 mol, of X was added to it dropwise. The reaction mixture was held at reflux with mechanical stirring for 60 hr. Then 30 ml of ethanol was removed from it by vacuum distillation, and the remainder was maintained at reflux for an additional 25 hr. It was diluted with 100 ml of ether and cooled at −15° for 2 days. The solid that had precipitated was recovered on a filter, and was washed with ether until it was white. Additional such solid precipitated when 50 ml of ether was added to the filtrate to give a total of 6.62 g, 0.0159 mol (41 percent), of XI: nmr ($D_2O$, DSS; integration of ring protons not given due to exchange) $\delta 5.72$, 4.92 and 4.88 (3 $m$, 3, $CH=CH_2$), 5.07 ($s$, OCCHCO), 4.22 ($q$, 2, J = 7 Hz, $CH_2CH_3$), 3.90 ($s$, 4, $OCH_2CH_2O$), 3.12 ($d$, J = 10 Hz, HCCOO), 2.20 (m, $OCCH_2CH$), 2.00 (br $m$, 2, $CH_2CH=CH_2$) 1.36 (br $m$, 15, $CH(CH_2)_5$—C—$(CH_2)_2CH_2$), and 1.27 ppm ($t$, 3, J = 7 Hz, $CH_3$).

EXAMPLE 12

This example illustrates the preparation of ethyl 3-bromo-6-(6-keto-10-undecenyl)-β-dihydroresorcylate ethylene ketal XII by the following general reaction wherein X = 3 and Y = 5:

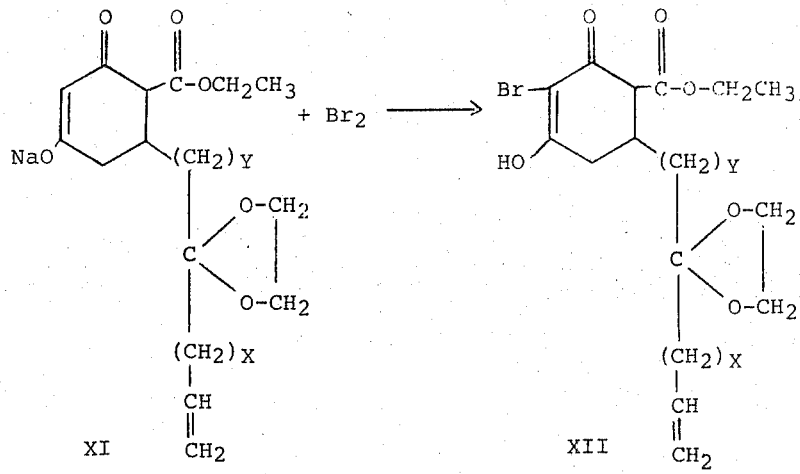

A solution of 1.78 g, 0.0111 mol, of bromine and 6.60 g, 0.0640 mol, of sodium bromide in 50 ml of water was added dropwise over 1 hr to a rapidly stirred one of 4.64 g, 0.0111 mol, of XI in 150 ml of water held at 0°. After 30 min, the flocculent solid that had precipitated was extracted into 150 ml of ether. The extract was washed with water (3 × 75 ml), and briefly dried (Na$_2$SO$_4$, discoloration occurred with prolonged drying). Evaporation in a vacuum rotary evaporator gave 4.0 g, 0.00846 mol (76 percent), of crude XII: nmr (CDCl$_3$, TMS) δ7.00 (s, 1, 4—OH), 5.72, 4.92 and 4.88 (3 m, 3, CH=CH$_2$), 4.22 (q, 2, J = 7 Hz, COOCH$_2$), 3.90 (s, 4, OCH$_2$CH$_2$O), 3.35 (d, 1, J = 10 Hz, HCCOO), 2.72 (dd, 1, J$_{AB}$ = 20.4 Hz, J$_{AX}$ = 11.0 Hz, OCCH$_2$CH), 2.43 (dd, 1, J$_{AB}$ = 20.4 Hz, J$_{BX}$ = 8.6 Hz, OCCH$_2$CH), 2.06 (br m, 2, CH$_2$CH=CH$_2$), 1.42 (br m, 15, CH(CH$_2$)$_5$—C—(CH$_2$)$_2$CH$_2$), and 1.30 ppm (t, 3, J = 7 Hz, CH$_3$).

In Example 12, the temperature at which the reaction of bromine with Compound XI is allowed to occur is kept at 0° C in order to minimize the reaction of bromine with the double bond in the side chain of the compound. Temperatures up to 25° C could be used for this reaction but 0° C is preferred. A lower temperature limit of about −10° C is set since the aqueous reaction mixture could freeze below −10° C and of course the desired reaction would be too slow.

EXAMPLE 13

This example illustrates the preparation of ethyl 6-(6-keto-10-undecenyl)-β-resorcylate ethylene ketal XIII by the following general reaction wherein X = 3 and Y = 5.

tract was quickly washed with water (4 × 100 ml) until such washings were neutral. It was decolorized with charcoal, dried (Na$_2$SO$_4$), and evaporated in a vacuum rotary evaporator to yield 2.87 g of a mixture containing XIII and the corresponding ketone.

Again, a solution of this mixture, 0.05 g of p-toluenesulfonic acid monohydrate, and 6.0 ml of ethylene glycol in 350 ml of benzene was heated at reflux under nitrogen until no more water collected in the Dean-Stark Trap. It was washed with 10 percent sodium bicarbonate (2 × 50 ml), saturated brine (6 × 50 ml) and water (1 × 50 ml), and then evaporated in a Rinco vacuum rotary evaporator. Purification by dry column chromatography (100 g Silica Gel H partially neutralized and moistened with 15 g of water; 10 percent ethyl ether in methylene chloride) yielded 1.74 g 0.00444 mol (ca. 52 percent), of XIII: nmr (CDCl$_3$, TMS) δ11.76 (s, 1, 2—OH), 6.73 (s, 1, 4—OH), 6.33 and 6.30 (2 d, 2, J = 2 Hz, aromatic CH), 5.72, 4.92 and 4.88 (3 m, 3,CH=CH$_2$), 4.40 (q, 2, J = 7 Hz, COOCH$_2$), 3.96 (s, 4, OCH$_2$CH$_2$O), 2.82 (t, 2, J = 7 Hz, ArCH$_2$), 2.08 (br m, 2, CH$_2$CH=CH$_2$), 1.47 (br m, 12, CH$_2$(CH$_2$)$_4$—C—(CH$_2$)$_2$CH$_2$), and 1.41 ppm (t, 3, J = 7 Hz, CH$_3$).

In Example 13 the de-hydrobromination of compound XII can be effected at temperatures in the range 60°–120° C but a temperature near 80° C is preferred. At a temperature of 80° C the rate of de-hydrobromination is reasonably fast and there is not too much formation of the ketone derived from compound XIII.

The de-hydrobromination step could be carried out

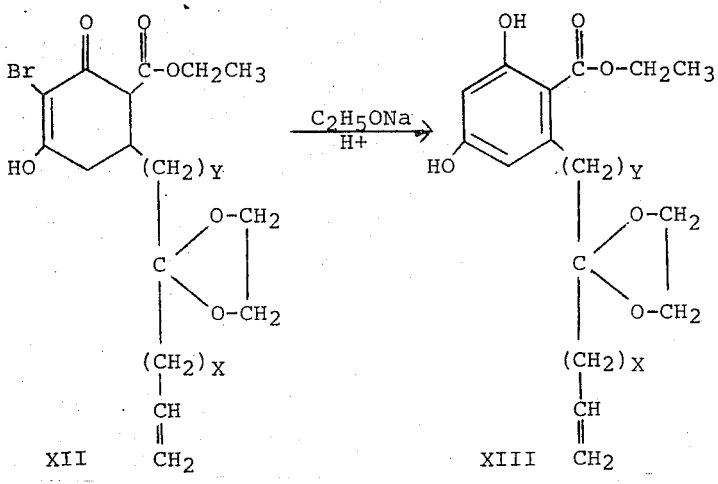

4.00 g, 0.00846 mol, of the crude XII was added to a solution of sodium ethoxide prepared from 4.40 g, 0.191 g-atom, of sodium and 130 ml of ethanol. The reaction mixture was held at reflux under nitrogen for 9 hr, and then 70 ml of it was evaporated under vacuum. While the residual mixture was cooled to 0°, 200 ml of water was added to it. It was acidified, and was extracted with ether (3 × 100 ml) immediately. The exin a menstruum of an alcohol other than ethanol, for example methanol or butanol.

EXAMPLE 14

This example illustrates the preparation of ethyl 6-(6-keto-10-undecenyl)-β-resorcylate ethylene ketal dibenzyl ether XIV by the following general reaction wherein X = 3 and Y = 5:

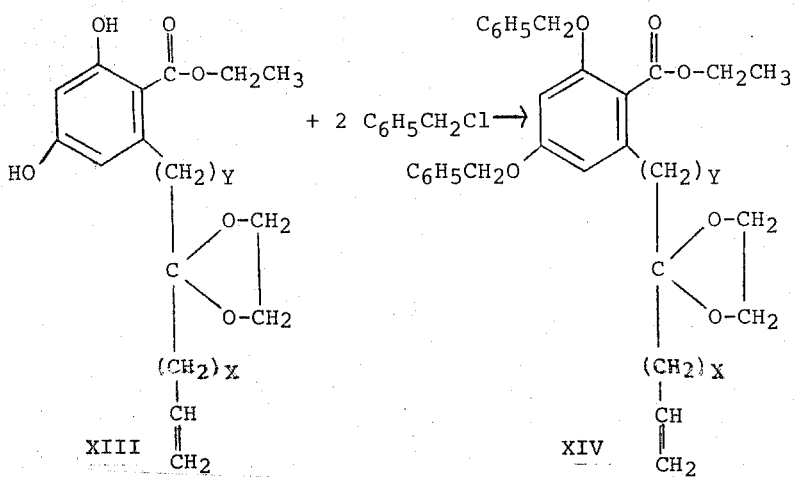

A solution of 1.40 g, 0.00357 mol, of XIII, 4.0 g of anhydrous potassium carbonate, and 2.0 ml. 0.0157 mol, of benzyl chloride in 32 ml of dimethylsulfoxide was heated on a steam bath with stirring for 6 hr. 32 ml of water was added to it, and it was extracted with ether (2 × 75 ml). The extract was washed with water (7 × 50 ml), dried ($Na_2SO_4$), and evaporated (Rinco). The residue was purified by dry column chromatography (100 g of Silica Gel H partially neutralized and moistened with 15 g of water; 10 percent ethyl acetate in benzene) to give 1.55 g, 0.00271 mol (76 percent), of XIV and its ketone.

A solution of 0.50 g of this mixture, 0.05 g of p-toluenesulfonic acid monohydrate, and 5.0 ml of ethylene glycol in 150 ml of benzene was heated at reflux for 45 hr while water was removed from the azeotrope by a Dean-Stark trap. The reaction mixture was washed with 10 percent sodium bicarbonate (2 × 50 ml), saturated brine (5 × 50 ml), and water (1 × 50 ml). The solution, when dried ($Na_2SO_4$) and evaporated in a Rinco Vacuum rotary evaporator, yielded 0.56 g of XIV: nmr ($CDCl_3$, TMS) δ7.28 (m, 10, $C_6H_5$), 6.41 (s, 2, aromatic CH), 5.72, 4.92 and 4.88 (3 m, 3, CH=$CH_2$), 4.88 (s, 4, $C_6H_5CH_2O$), 4.28 (q, 2, J = 7 Hz, $COOCH_2$), 3.85 (s, 4, $OCH_2CH_2O$), 2.58 (t, 2, J = 6 Hz, $ArCH_2$), 1.97 (m 2, $CH_2$CH=$CH_2$), 1.44 (br m, 12, $CH_2(CH_2)_4$—C—$(CH_2)_2CH_2$), and 1.22 ppm (t, 3, J = 7 Hz, $CH_3$).

In the foregoing example, the hydroxyl groups of compound XIII have been protected by the formation of benzyl ethers. Such protective action can be obtained by the formation of lower alkyl ethers and tetrahydropyranyl ethers. The benzyl ethers are preferred since they are readily formed and can be easily removed by a hydrogenation procedure.

EXAMPLE 15

This example illustrates the preparation of ethyl 6-(6-keto-10-hydroxyundecyl)-β-resorcylate ethylene ketal dibenzyl ether by the following general reaction wherein X = 3 and Y = 5:

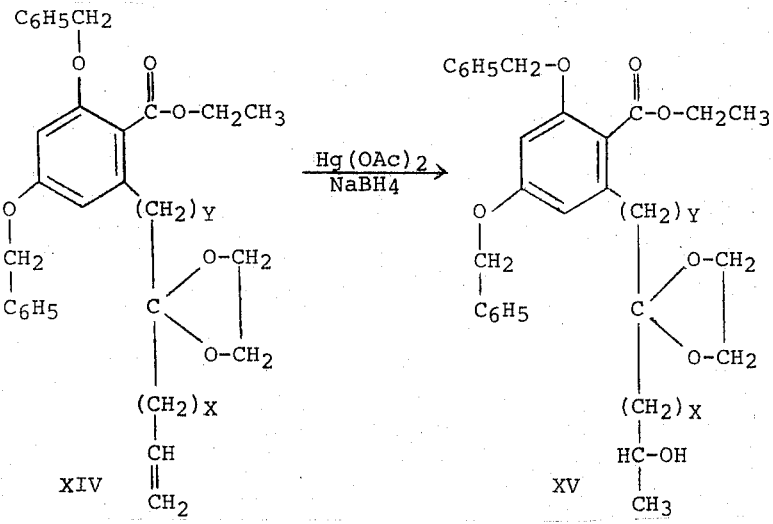

0.56 g, 0.00098 mol, of XIV in 15 ml of tetrahydrofuran was added to a stirred solution of 3.12 g, 0.0098 mol, of mercuric acetate in 10 ml of water, and the reaction mixture was stirred for 45 hr at 25°. Then 12.0 ml of 3 N sodium hydroxide was added to it, and stirring was continued for 30 min. It was stirred for an additional 30 min after 0.235 g, 0.0062 mol, of sodium borohydride in 10 ml of 3 N sodium hydroxide solution was added. The reaction mixture was evaporated in a vacuum rotary evaporator at 25 ° and the residue was taken into ether (3 × 50 ml). The extract was washed with saturated sodium chloride (5 × 35 ml) and water (1 × 35 ml), and dried ($Na_2SO_4$). Evaporation of ether in a vacuum rotary evaporator and removal of volatile impurities by sublimation yielded 0.40 g, of a mixture containing equimolar amounts of unreacted XIV and XV: nmr of XV ($CDCl_3$, TMS) δ7.32 (m, 10, $C_6H_5$ ), 6.45 (s, 2, aromatic CH), 5.03 and 5.00 (2 s, 4, $C_6H_5CH_2O$), 4.65 (br s, 1, OH), 4.30 (q, 2, J = 7 Hz, $COOCH_2$), 3.87 (s, 4, $OCH_2CH_2O$), 3.68 (br m, 1, OCH—$CH_3$), 2.60 (t, 2, J = 6 Hz, $ArCH_2$), 1.37 (br m, 14, $CH_2(CH_2)_4-C-(CH_2)_3CH$), 1.26 ($t$, 3, J = 7 Hz, $CH_2CH_3$), and 1.13 ppm ($d$, 3, J = 6.5 Hz, $CHCH_3$).

The reaction of the olefinic compound XIV with mercuric acetate has been carried out at 25° C in Example 15. The temperature limits for this reaction are 0° C and 60° C. Below 0° C the reaction is too slow and above 60° C unwanted side reactions occur.

EXAMPLE 16

This example illustrates the preparation of 6-(10-hydroxy-6-keto-undecyl)-β-resorcylic acid dibenzyl ether XVI by the following general reaction sequence wherein X = 3 and Y = 5.

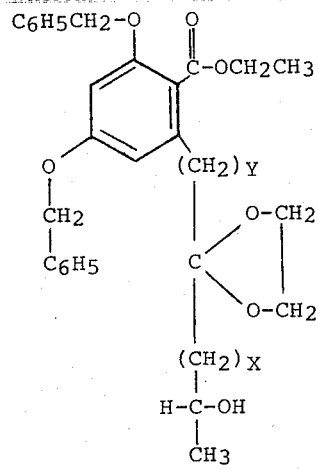

XV

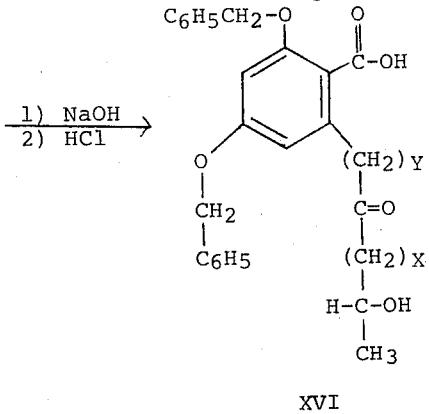

XVI

A solution of 0.40 g of the mixture of XIV and XV and 9.0 ml of 20 percent sodium hydroxide in 15 ml of dimethylsulfoxide was gently refluxed under nitrogen for 8 hr (ca. 120°). The reaction mixture was made strongly acidic with concentrated hydrochloric acid while it was cooled in an ice bath and then it was extracted with ether (3 × 50 ml). The extract was washed with saturated brine; (1 × 20 ml), and then evaporated in a vacuum rotary evaporator. A solution of the residual product in 20 ml of acetone containing 0.5 ml of concentrated hydrochloric acid was held at reflux under nitrogen for 10 min. Acetone was evaporated at 25° in a vacuum rotary evaporator and the residue was dissolved in 25 ml of ether. This solution was washed with saturated brine (5 × 5 ml) and water (1 × 5 ml), dried ($Na_2SO_4$); and evaporated in a vacuum rotary evaporator to yield 0.33 g of an equal mixture of acid derived from XIV and XVI: nmr ($CDCl_3$, TMS) δ8.67 (br s, 2, COOH and OH), 7.34 ($s$, 10, $C_6H_5$), 6.45 ($s$, 2, aromatic CH), 5.02 and 4.99 (2 $s$, 4, $C_6H_5CH_2$), 3.77 (br $m$, 1, $CHCH_3$), 2.73 ($t$, 2, J = 6 Hz, $ArCH_2$), 2.35 ($t$, 4, J = 7 Hz, $CH_2COCH_2$), 1.44 (br $m$, 10 $CH_2(CH_2)_3CH_2$ and $(CH_2)_2CH$), and 1.13 ppm ($d$, 3, J = 6.5 Hz, $CH_3$).

In Example 16, Compound XV is reacted with caustic at 120° C. The temperature limits for this reaction are 25° C to 160° C. At temperatures below 25° C, the reaction with caustic is too slow. At temperatures above 160° C, benzyl groups are lost by hydrolysis.

EXAMPLE 17

This example illustrates the preparation of (R,S)zearalanone dibenzyl ether XVII by the following general reaction wherein X = 3 and Y = 5:

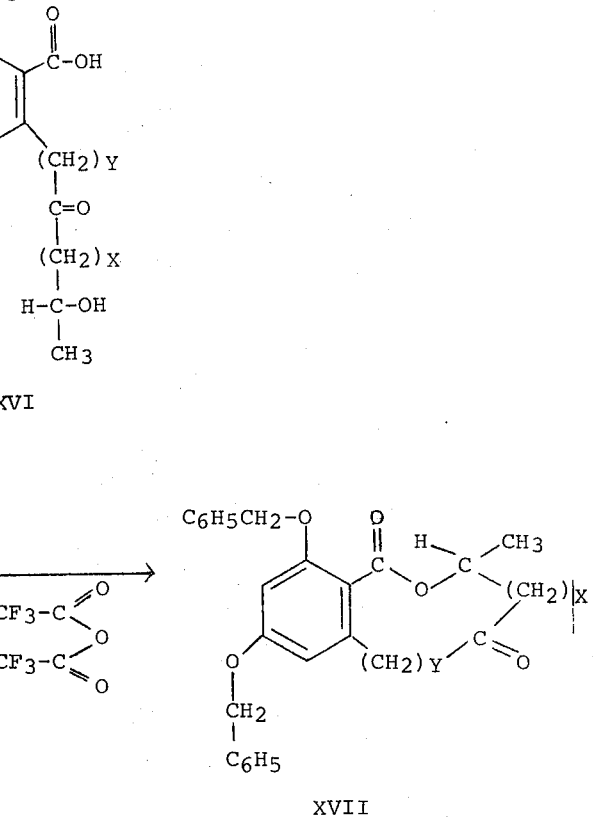

XVII 1.0 g of Linde 3A molecular sieves was added to a solution of 0.23 g of the crude XVI (ca. 50 percent pure) in 100 ml of benzene (dried by distillation from sodium). This solution was stirred under nitrogen at 6° while freshly prepared trifluoroacetic anhydride was added to it according to the following schedule: 0 hr, 0.0932 g, 0.000443 mol, first equiv; 9 hr, second equiv; 21 hr, third equiv. After 31 hr, 50 ml of 5 percent sodium hydroxide was added while the reaction mixture was stirred. The organic layer was separated and it was washed with 4N hydrochloric acid, saturated brine (4 × 25 ml) and water (1 × 25 ml). It was dried ($Na_2SO_4$), and then its evaporation in a vacuum rotary evaporator gave 0.21 g of residue that was submitted to dry column chromatography (40 g of Silica Gel H, 10 percent ethyl acetate in benzene). Solids isolated by evaporation of appropriate fractions were recrystallized from ligroin (60°–68°) to give 0.0289 g, 0.000058 mol (ca. 26 percent based upon XVI in the starting mixture) of pure XVII: mp 103°–105°; mass spectrum (70 eV) m/e (rel intensity) 500(6), 482(2), 409(2), 391(2), 181(6), 91(100), 69(2), 65(4), 32(2), 28(8).

This mass spectrum is identical to that of S-zearalanone dibenzyl ether. The melting point is the same as other samples of XVII prepared via other sequences. A mixed melting point was not depressed.

In Example 17, ring closure of Compound XVI is effected using the reagent trifluoroacetic anhydride in a dry menstruum of benzene at a temperature of 6° C. Since benzene freezes at 5.5° C, a temperature much lower than 6° C is not feasible. With toluene, a lower temperature would be possible, but the reaction is quite slow even at 6° C so that lower temperatures are not attractive. Higher temperatures up to 60° C are feasible, but side reactions will be more prevalent the higher the temperature.

EXAMPLE 18

This example illustrates the preparation of DL-zearalanone XVIII by the following general reaction wherein X = 3 and Y = 5:

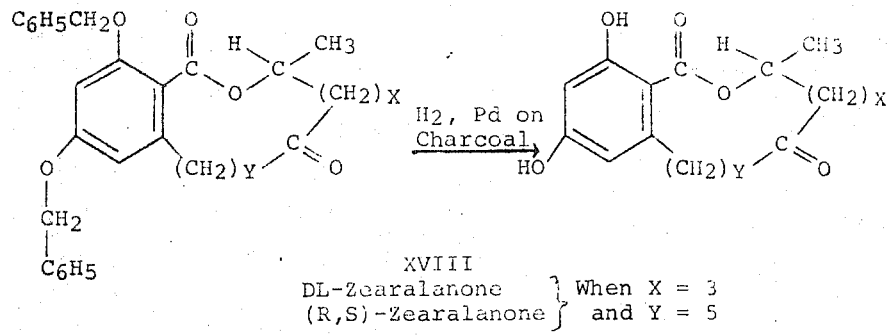

XVIII
DL-Zearalanone ⎱ When X = 3
(R,S)-Zearalanone ⎰ and Y = 5

A solution of 0.100 g, 0.0002 mol, of XVII in 10.0 ml of ethyl acetate and 4.0 ml of absolute ethanol with 0.05 g of 10 percent palladium on charcoal catalyst and three drops of triethylamine added was hydrogenated at 1 atm until hydrogen consumption ceased. The reaction mixture was then filtered and evaporated in a Rinco Vacuum rotary evaporator, and the residue was purified by preparative thin layer chromatography (Silica Gel, 10 percent ethyl acetate in benzene) to give 0.054 g, 0.000169 mol (84 percent), of XVIII: mp 208°–210° (from acetone); nmr (acetone-$d_6$, TMS) $\delta$11.87 (br s, 1, 2—OH), 6.32 (d, 1, J = 2.5 Hz, aromatic CH), 6.28 (d, 1, J = 2.5 Hz, aromatic CH), 7.34 (br s, 1, 4—OH), 5.20 (br m, 1, COOCH), 3.02 and 2.74 (2 br m, 6, ArCH$_2$ and CH$_2$COCH$_2$), 2.50 to 1.20 (very br m, 10, CH$_2$(CH$_2$)$_3$CH$_2$ and CH(CH$_2$)$_2$CH$_2$), and 1.32 ppm (d, 3, J = 6.0 Hz, CH$_3$); mass spectrum (70 eV) m/e (rel intensity) 320(35), 302(19), 251(19), 177(36), 163(98), 150(35), 69(46), 55(76), 41(100). These nmr and mass spectra are identical to those of naturally-derived S-zearalanone.

We claim:
1. A compound of the formula

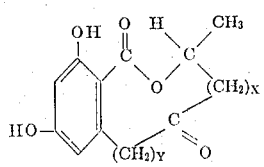

wherein X is an integer having the value of from 0 to 6 and Y is an integer having the value of from 3 to 8, with the proviso that when X is 3, Y is not 5.

2. A method for the chemical synthesis of (R,S)-zearalanone which comprises the steps of
   a. reacting caprolactone with acetic acid to prepare 6-acetoxyhexanoic acid;
   b. pyrolyzing 6-acetoxyhexanoic acid at an elevated temperature to prepare 5-hexenoic acid;
   c. reacting 5-hexenoic acid with thionyl chloride to prepare 5-hexenoyl chloride;
   d. reacting cyclohexanone with morpholine to prepare the enamine of cyclohexanone;
   e. reacting the enamine of cyclohexanone with 5-hexenoyl chloride to prepare 2-(5-hexenoyl)-cyclohexanone;
   f. reacting 2-(5-hexenoyl)-cyclohexanone with a base to prepare 7-keto-11-dodecenoic acid;
   g. reacting 7-keto-11-dodecenoic acid with ethylene glycol to prepare 2-hydroxyethyl 7-keto-11-dodecenoate ethylene ketal;
   h. reacting 2-hydroxyethyl 7-keto-11-dodecenoate ethylene ketal with dimethyl amine to prepare N,N-dimethyl 7-keto-11-dodecenamide ethylene ketal;
   i. reacting N,N-dimethyl 7-keto-11-dodecenamide ethylene ketal with lithium aluminum hydride to prepare 7-keto-11-dodecenal ethylene ketal;
   j. reacting 7-keto-11-dodecenal ethylene ketal with malonic acid to prepare 9-keto-2,13-tetradecadienic acid ethylene ketal;
   k. reacting 9-keto-2,13-tetradecadienic acid ethylene ketal with ethylene glycol to prepare 2-hydroxyethyl 9-keto-2,13-tetradecadienoate ethylene ketal;
   l. reacting the sodium salt of acetoacetic ester with 2-hydroxyethyl 9-keto-2,13-tetradecadienoate ethylene ketal to prepare the sodium salt of ethyl 6-(6-keto-10-undecenyl)-$\beta$-dihydroresorcylate ethylene ketal;
   m. reacting bromine with the sodium salt of ethyl 6-(6-keto-10-undecenyl)-$\beta$-dihydroresorcylate ethylene ketal to prepare ethyl 3-bromo-6-(6-keto-10-undecenyl)-$\beta$-dihydroresorcylate ethylene ketal;
   n. reacting ethyl 3-bromo-6-(6-keto-10-undecenyl)-$\beta$-dihydroresorcylate ethylene ketal with sodium ethoxide to prepare ethyl 6-(6-keto-10-undecenyl)-$\beta$-resorcylate ethylene ketal;

o. reacting ethyl 6-(6-keto-10-undecenyl)-β-resorcylate ethylene ketal with benzyl chloride to prepare ethyl 6-(6-keto-10-undecenyl)-β-resorcylate ethylene ketal dibenzyl ether;

p. reacting ethyl 6-(6-keto-10-undecenyl-β-resorcylate ethylene ketal dibenzyl ether with mercuric acetate and sodium borohydride to prepare ethyl 6-(6-keto-10-hydroxyundecyl)-β-resorcylate ethylene ketal dibenzyl ether;

q. reacting ethyl 6-(6-keto-10-hydroxyundecyl)-β-resorcylate ethylene ketal dibenzyl ether with sodium hydroxide in a dimethyl sulfoxide-water menstruum and then with acid to prepare 6-(10-hydroxy-6-ketoundecyl)-β-resorcylic acid dibenzyl ether;

r. reacting 6-(10-hydroxy-6-keto-undecyl)-β-resorcylic acid dibenzyl ether in the presence of trifluoroacetic anhydride to prepare (R,S)-zearalanone dibenzyl ether;

s. reacting (R,S)-zearalanone dibenzyl ether with hydrogen to prepare (R,S)-zearalanone.

3. A method for preparing a compound of formula I

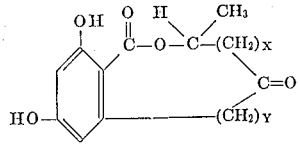

wherein X is an integer having the value of from 0 to 6 and Y is an integer having the value of from 3 to 8, comprising a. reacting a compound of formula II

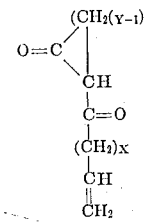

with a base to prepare a compound of formula III

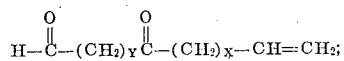

b. reacting compound of formula III with ethylene glycol to prepare a compound of formula IV

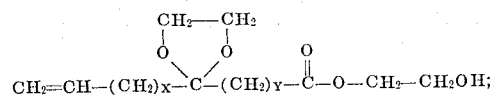

c. reacting compound of formula IV with dimethyl amine to prepare compound of formula V

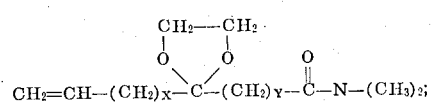

d. reacting compound of formula V with lithium aluminum hydride to prepare compound of formula VI

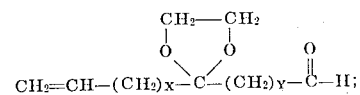

e. reacting compound of formula VI with malonic acid to prepare compound of formula VII

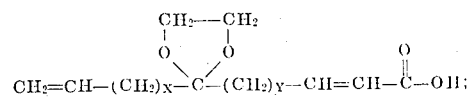

f. reacting compound of formula VII with ethylene glycol to prepare compound of formula VIII

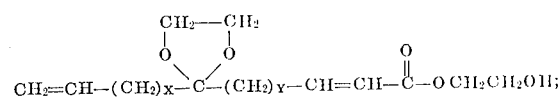

g. reacting compound of formula VIII with the sodium salt of acetoacetic ester to prepare compound of formula IX

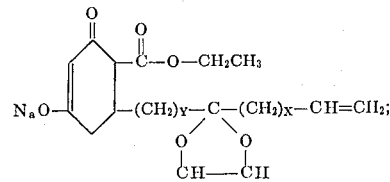

h. reacting compound of formula IX with bromine to prepare compound of formula X

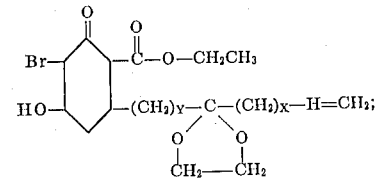

i. reacting compound of formula X with sodium ethoxide to prepare compound of formula XI

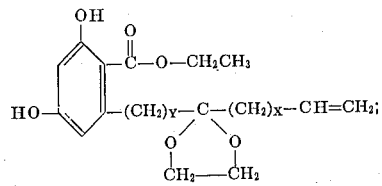

j. reacting compound of formula XI with benzyl chloride to prepare compound of formula XII

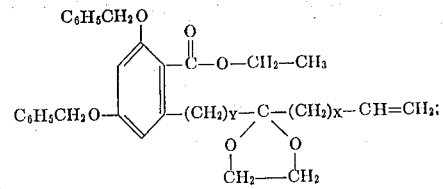

k. reacting compound of formula XII with mercuric acetate and sodium borohydride to prepare compound of formula XIII

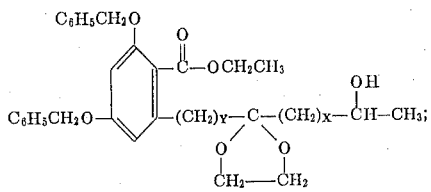

l. reacting compound of formula XIII with sodium hydroxide in a dimethyl sulfoxide-water menstrumm and then with acid to prepare compound of formula XIV

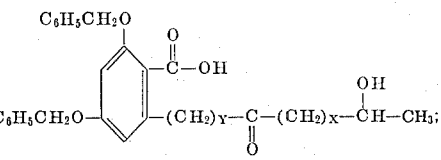

m. reacting compound of formula XIV in the presence of trifluoroacetic anhydride to prepare compound of formula XV

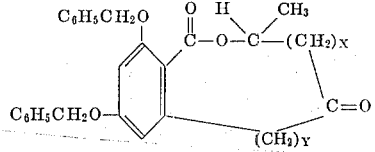

n. reacting compound of formula XV with hydrogen to prepare compound of formula I.

* * * * *